(No Model.)
A. P. SQUIRES.
FELLY FOR BICYCLE WHEELS.
No. 521,187. Patented June 12, 1894.
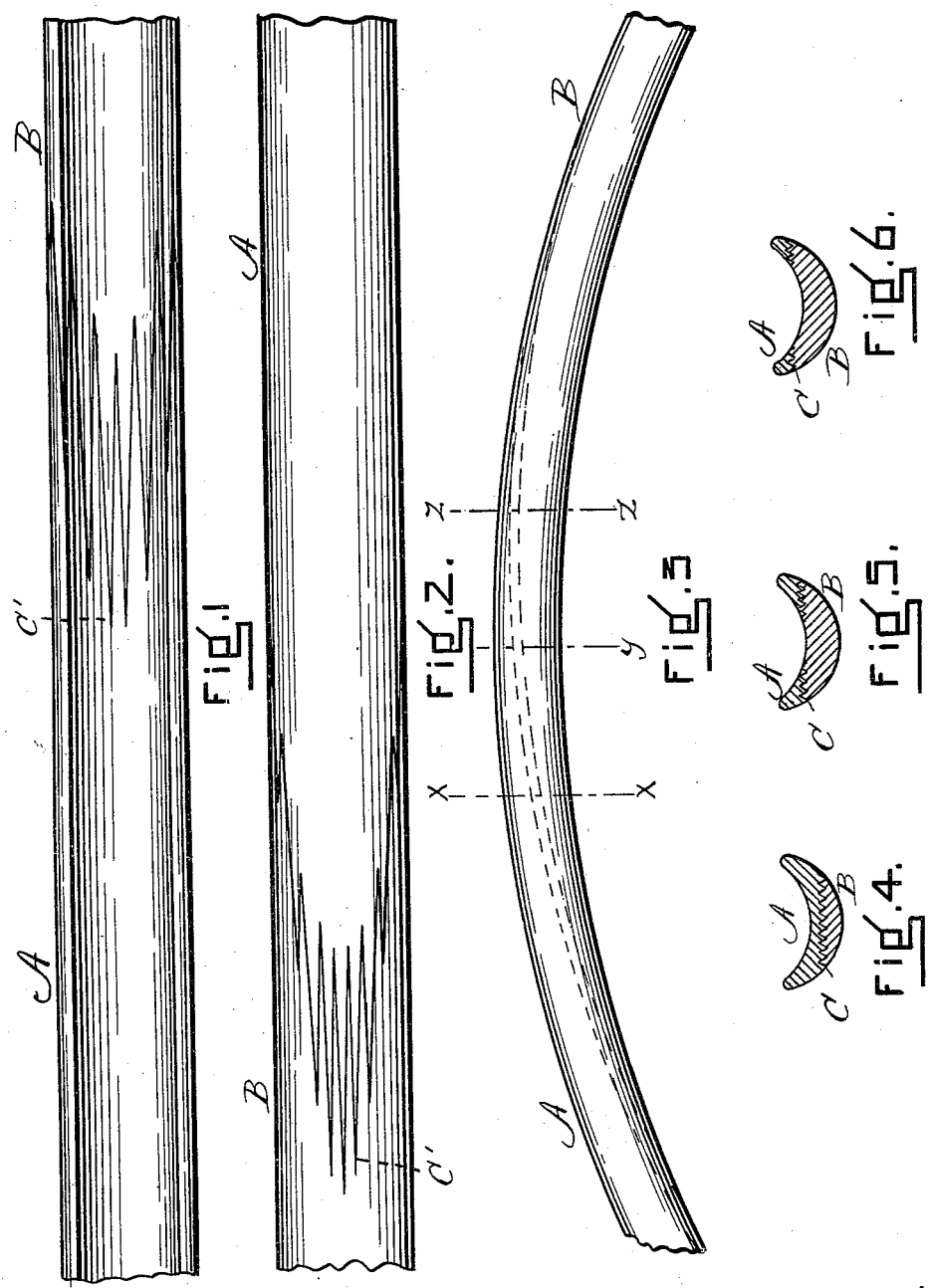

UNITED STATES PATENT OFFICE.

ASA P. SQUIRES, OF CHICOPEE FALLS, MASSACHUSETTS.

FELLY FOR BICYCLE-WHEELS.

SPECIFICATION forming part of Letters Patent No. 521,187, dated June 12, 1894.

Application filed March 20, 1894. Serial No. 504,389. (No model.)

*To all whom it may concern:*

Be it known that I, ASA P. SQUIRES, a citizen of the United States, residing at Chicopee Falls, in the county of Hampden and State of Massachusetts, have invented a new and useful Improvement in Joints of Rims or Fellies of Wheels of Bicycles, Tricycles, and other Vehicles, of which the following is a specification.

This improvement relates to a new and improved construction of the joints of wooden rims or fellies of wheels, more particularly for use in connection with bicycles and tricycles. It has been found difficult to construct the joints of wooden bicycle rims so as to be sufficiently strong, especially as rims for this style of wheel are grooved deeply and hence are comparatively thin in cross section. Joints have been made by abutting the ends of the rim and covering it at that point with steel, by lapping the ends and covering the joint with linen, and by locking the ends together by means of parallel tenons. None of these constructions however, have afforded sufficient strength at the joint for a rim of the style used for bicycle and tricycle wheels.

My invention is intended to obviate or remedy this difficulty, and to produce a rim which will be at the joint as strong or stronger than at any other point, and I accomplish this result by means of internally corrugated laps, usually about one foot long in practice, nesting into each other, and producing the effect on the opposite surfaces of the rim, of long, thin, graduated, pointed interlapping tongues. By this means, an enormous gluing surface is obtained, and there are no abutting end portions.

The nature of the invention in detail is fully described below, and illustrated in the accompanying drawings, in which—

Figure 1 is a plan view of the outer or grooved side of a portion of the rim at the joint. Fig. 2 is a plan view of the inner side at the same point. Fig. 3 is a side view of the same. Figs. 4, 5, and 6 are cross sections on lines *x*, *y*, and *z*, respectively.

Similar letters of reference indicate corresponding parts.

A represents the overlapping portion of the rim at the joint, and B the underlapping portion. As will be seen in Figs. 4, 5, and 6, each lap is provided on its inner surface with longitudinal corresponding corrugations C, of size and shape to exactly fit into each other. The ribs constituting these corrugations come to the surface as shown at C', in the form of long tapering strips or pointed tongues. It is apparent that the gluing surface provided by these extended corrugations is very great, and the adhesive power, and hence the resistance against parting, is enormous. It is also evident that there is no necessity for wrapping or covering the joint.

The broken lines in Fig. 3 indicate the line of direction of the joint, which, as will be seen, is on a tangential curve with the circle described by the inner surface of the rim.

Having thus fully described my invention, what I claim, and desire to secure by Letters Patent, is—

1. The herein described joint for wooden rims or fellies, consisting of the lapping portions A B correspondingly corrugated longitudinally and fitting together as shown and adhesively secured to each other, said corrugations coming to the surface on the outer and inner surfaces of the felly in opposite directions, substantially as set forth.

2. A joint for wooden rims or fellies, comprising lapping portions each of which is longitudinally corrugated on its inner side, substantially as described.

ASA P. SQUIRES.

Witnesses:
SIDNEY SANDERS,
ELMER R. TAYLOR.